US008130936B2

(12) United States Patent
Kortum et al.

(10) Patent No.: US 8,130,936 B2
(45) Date of Patent: Mar. 6, 2012

(54) SYSTEM AND METHOD FOR ON HOLD CALLER-CONTROLLED ACTIVITIES AND ENTERTAINMENT

(75) Inventors: Philip Ted Kortum, Austin, TX (US); Benjamin Anthony Knott, Round Rock, TX (US); Robert R. Bushey, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1116 days.

(21) Appl. No.: 11/071,068

(22) Filed: Mar. 3, 2005

(65) Prior Publication Data
US 2006/0198505 A1 Sep. 7, 2006

(51) Int. Cl.
*H04M 3/00* (2006.01)

(52) U.S. Cl. ......... 379/266.01; 379/114.13; 379/265.09; 379/393

(58) Field of Classification Search ............ 379/201.04, 379/101.01, 102.01, 114.13, 265.01–266.06, 379/393
See application file for complete search history.

(56) References Cited

U.S. PATENT DOCUMENTS

| | | | |
|---|---|---|---|
| 4,953,204 A | | 8/1990 | Cuschleg, Jr. et al. |
| 4,967,405 A | | 10/1990 | Upp et al. |
| 5,125,024 A | * | 6/1992 | Gokcen et al. ............ 379/88.01 |
| 5,335,269 A | | 8/1994 | Steinlicht |
| 5,415,416 A | * | 5/1995 | Scagnelli et al. ................ 463/25 |
| 5,530,744 A | | 6/1996 | Charalambous et al. |
| 5,590,186 A | | 12/1996 | Liao et al. |
| 5,828,735 A | * | 10/1998 | Farfan ........................ 379/93.13 |
| 5,918,213 A | * | 6/1999 | Bernard et al. ................. 705/26 |
| 5,953,704 A | | 9/1999 | McIlroy et al. |
| 6,014,439 A | * | 1/2000 | Walker et al. ............ 379/266.01 |
| 6,119,101 A | | 9/2000 | Peckover |
| 6,173,266 B1 | | 1/2001 | Marx et al. |
| 6,269,153 B1 | | 7/2001 | Carpenter et al. |
| 6,317,439 B1 | | 11/2001 | Cardona et al. |
| 6,333,980 B1 | | 12/2001 | Hollatz et al. |
| 6,381,329 B1 | | 4/2002 | Uppaluru et al. |
| 6,385,584 B1 | | 5/2002 | McAllister et al. |

(Continued)

FOREIGN PATENT DOCUMENTS

EP 0 424 015 A2 4/1991

(Continued)

OTHER PUBLICATIONS

U.S. Appl. No. 11/062,100, filed Feb. 18, 2005.

(Continued)

*Primary Examiner* — Simon Sing
(74) *Attorney, Agent, or Firm* — Toler Law Group, PC

(57) ABSTRACT

The present disclosure provides a system and method configured to provide a caller with selectable activities and entertainment when the caller is on-hold. The system and method establishes a connection between a caller and a receiving system, wherein the receiving system is configured to access a plurality of entertainment sources utilizing a selectable link. The receiving system can determine a caller's selection and retrieve the selection from an entertainment provider that stores the selection. The caller can select an entertainment category from a plurality of entertainment categories and select specific audible selections within the categories to be played to the caller. The system and method can provide a menu driven interaction and respond to voice commands and touchtone input to provide the selected entertainment from specific artists, games, and entertainers.

11 Claims, 2 Drawing Sheets

U.S. PATENT DOCUMENTS

| | | | |
|---|---|---|---|
| 6,389,400 B1 | 5/2002 | Bushey et al. | |
| 6,400,804 B1 * | 6/2002 | Bilder | 379/76 |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,483,895 B2 * | 11/2002 | Bixler et al. | 379/67.1 |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,570,967 B2 | 5/2003 | Katz | |
| 6,598,136 B1 | 7/2003 | Norrod et al. | |
| 6,614,781 B1 | 9/2003 | Elliott et al. | |
| 6,631,186 B1 | 10/2003 | Adams et al. | |
| 6,678,360 B1 | 1/2004 | Katz | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,885,734 B1 | 4/2005 | Eberle et al. | |
| 6,891,932 B2 | 5/2005 | Bhargava et al. | |
| 6,901,366 B1 | 5/2005 | Kuhn et al. | |
| 6,907,119 B2 | 6/2005 | Case et al. | |
| 7,139,390 B2 * | 11/2006 | Brown et al. | 379/265.02 |
| 7,245,716 B2 * | 7/2007 | Brown et al. | 379/266.01 |
| 7,336,775 B2 * | 2/2008 | Tanaka et al. | 379/93.17 |
| 7,487,112 B2 * | 2/2009 | Barnes, Jr. | 705/26.8 |
| 2001/0011211 A1 | 8/2001 | Bushey et al. | |
| 2001/0018672 A1 | 8/2001 | Petters et al. | |
| 2001/0032229 A1 | 10/2001 | Hulls et al. | |
| 2001/0034662 A1 | 10/2001 | Morris | |
| 2002/0087385 A1 | 7/2002 | Vincent | |
| 2002/0133394 A1 | 9/2002 | Bushey et al. | |
| 2002/0133413 A1 | 9/2002 | Chang et al. | |
| 2002/0156699 A1 | 10/2002 | Gray et al. | |
| 2002/0196277 A1 | 12/2002 | Bushey et al. | |
| 2003/0026409 A1 | 2/2003 | Bushey et al. | |
| 2003/0143981 A1 | 7/2003 | Kortum et al. | |
| 2003/0144919 A1 | 7/2003 | Trompette et al. | |
| 2003/0156133 A1 | 8/2003 | Martin et al. | |
| 2003/0187732 A1 | 10/2003 | Seta | |
| 2003/0187773 A1 | 10/2003 | Santos et al. | |
| 2003/0191648 A1 * | 10/2003 | Knott et al. | 704/275 |
| 2003/0194063 A1 | 10/2003 | Martin et al. | |
| 2003/0202640 A1 | 10/2003 | Knott et al. | |
| 2003/0202643 A1 | 10/2003 | Joseph et al. | |
| 2003/0202649 A1 | 10/2003 | Haug, Jr. et al. | |
| 2003/0204435 A1 | 10/2003 | McQuilkin et al. | |
| 2004/0005047 A1 | 1/2004 | Joseph et al. | |
| 2004/0006473 A1 | 1/2004 | Mills et al. | |
| 2004/0032862 A1 | 2/2004 | Schoeneberger et al. | |
| 2004/0032935 A1 | 2/2004 | Mills et al. | |
| 2004/0042592 A1 | 3/2004 | Knott et al. | |
| 2004/0044950 A1 | 3/2004 | Mills et al. | |
| 2004/0066401 A1 | 4/2004 | Bushey et al. | |
| 2004/0066416 A1 | 4/2004 | Knott et al. | |
| 2004/0073569 A1 | 4/2004 | Knott et al. | |
| 2004/0088285 A1 | 5/2004 | Martin et al. | |
| 2004/0103017 A1 | 5/2004 | Reed et al. | |
| 2004/0109555 A1 | 6/2004 | Williams | |
| 2004/0125937 A1 | 7/2004 | Turcan et al. | |
| 2004/0125938 A1 | 7/2004 | Turcan et al. | |
| 2004/0125940 A1 | 7/2004 | Turcan et al. | |
| 2004/0161078 A1 | 8/2004 | Knott et al. | |
| 2004/0161094 A1 | 8/2004 | Martin et al. | |
| 2004/0161096 A1 | 8/2004 | Knott et al. | |
| 2004/0174980 A1 | 9/2004 | Knott et al. | |
| 2004/0230438 A1 | 11/2004 | Pasquale et al. | |
| 2004/0240635 A1 | 12/2004 | Bushey et al. | |
| 2004/0243568 A1 | 12/2004 | Wang et al. | |
| 2005/0008141 A1 | 1/2005 | Kortum et al. | |
| 2005/0015744 A1 | 1/2005 | Bushey et al. | |
| 2005/0027535 A1 | 2/2005 | Martin et al. | |
| 2005/0041796 A1 | 2/2005 | Joseph et al. | |
| 2005/0047578 A1 | 3/2005 | Knott et al. | |
| 2005/0055216 A1 | 3/2005 | Bushey et al. | |
| 2005/0058264 A1 | 3/2005 | Joseph et al. | |
| 2005/0075894 A1 | 4/2005 | Bushey et al. | |
| 2005/0078805 A1 | 4/2005 | Mills et al. | |
| 2005/0080630 A1 | 4/2005 | Mills et al. | |
| 2005/0080667 A1 | 4/2005 | Knott et al. | |
| 2005/0131892 A1 | 6/2005 | Knott et al. | |
| 2005/0132262 A1 | 6/2005 | Bushey et al. | |
| 2005/0135595 A1 | 6/2005 | Bushey et al. | |
| 2005/0152531 A1 * | 7/2005 | Hamilton et al. | 379/266.01 |
| 2005/0169453 A1 | 8/2005 | Knott et al. | |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/898,722, filed Jul. 23, 2004.
U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 10/975,023, filed Oct. 27, 2004.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.

* cited by examiner

SYSTEM AND METHOD FOR ON HOLD CALLER-CONTROLLED ACTIVITIES AND ENTERTAINMENT

FIELD OF THE DISCLOSURE

The present disclosure relates generally to telephone communications and more particularly to on-hold activities and entertainment for a caller during a telephone call.

BACKGROUND

Millions of telephone calls are made to call centers and to individuals conducting business during every business hour. Often, when a telephone call is made the individual, agent or service desired by the caller is temporarily unavailable. When this occurs, a caller is typically put "on-hold." When a customer is on-hold some telephone answering systems play advertisements, others play "elevator" music while others repeatedly provide a message such as "Please hold" . . . . "Please hold" on and on for the entire time that a caller is on hold.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

The present disclosure provides a system and method configured to provide a caller with selectable activities and entertainment types when the caller is on-hold. The system and method establishes a connection between a caller and a receiving system, wherein the receiving system is configured to access a plurality of entertainment sources utilizing a selectable link. The receiving system can determine a caller's selection and retrieve the selection from an entertainment provider that stores the selection. The caller can select an entertainment type from a plurality of entertainment categories and select specific audible selections within the categories to be played to the caller. The system and method can provide a menu driven interaction and respond to voice commands and touchtone input to provide the selected entertainment from specific artists, games, and entertainers.

In practice, caller satisfaction may be increased and the perceived on-hold time duration may be reduced if a caller enjoys what they are listening to while on hold. As call centers cut costs and reduce employee counts, a customer may be on hold for several minutes before an agent or a system becomes available. When callers are required to listen to a repetitive "Please Hold" for several minutes or endure music that the caller does not enjoy, the caller can become annoyed and frustrated leading to abandon calls and reduced customer satisfaction. Most call centers handle huge volumes of calls and, even if a small percentage of calls are abandoned, the cost associated with abandoned calls can be significant.

Figure 1:
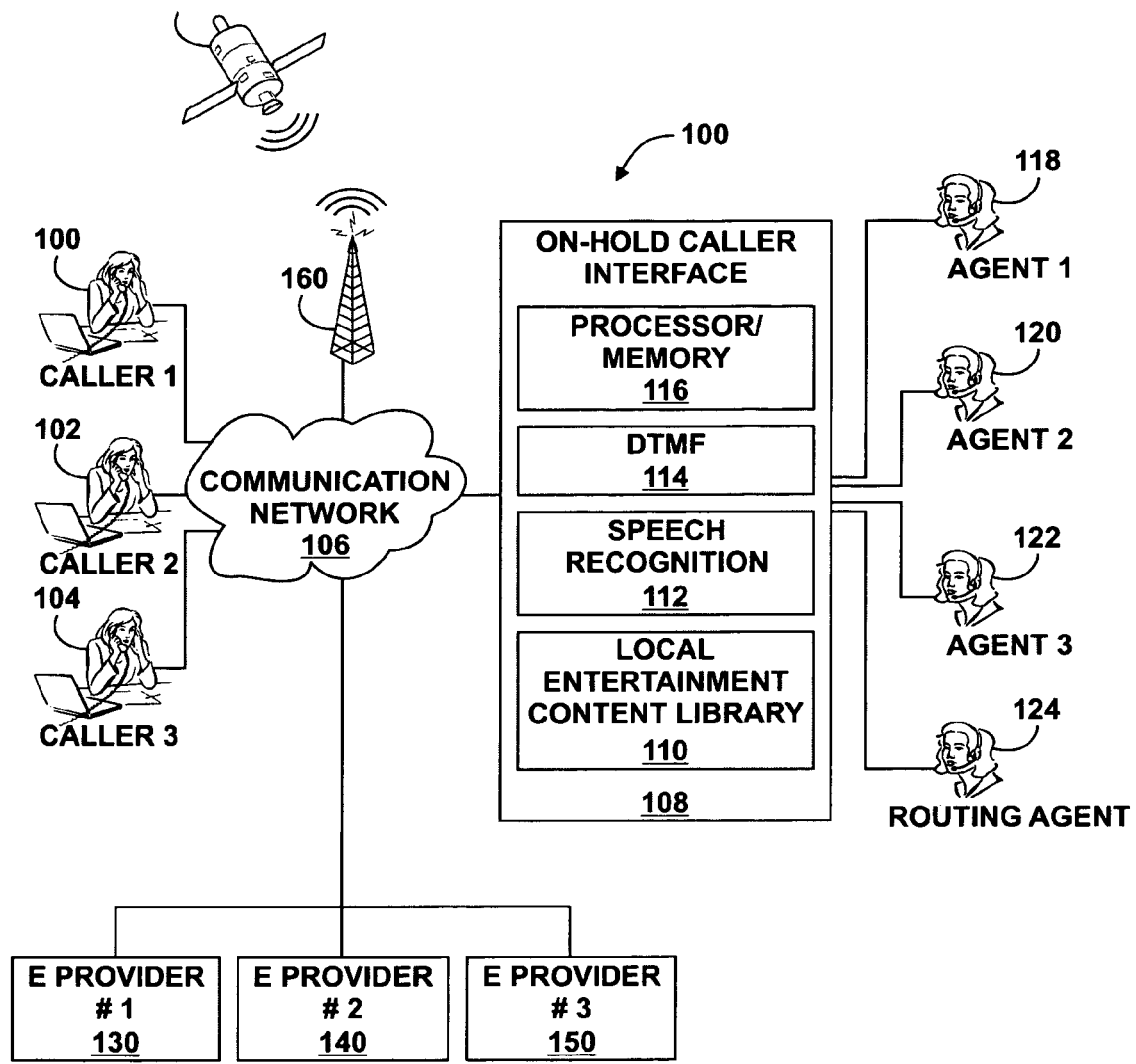
FIG. 1 illustrates a simplified configuration of a telecommunications system.

Referring to FIG. 1, an illustrated communication system 100 that includes an on-hold caller interface 108 is shown. The communication system 100 includes a plurality of representative callers 100, 102 and 104 coupled to a telephone/communications network 106, which can utilize telephony, IP protocols, or the like to couple the callers 100-104 to the on-hold caller interface 108. On-hold caller interface 108 can include a processor with a memory 116, a dual-tone multi-frequency detector (DTMF) 114 for accepting touchtone inputs, speech recognition module 112, for processing caller utterances, and a local entertainment content library 110. The on-hold caller interface 108 can couple callers 100-104 to a first agent 118, a second agent 120, a third agent 122, and a routing agent 124 depending on the caller's requirements.

In one configuration a first entertainment provider 130, second entertainment provider 140, third entertainment provider 150, and fourth entertainment provider 170 can be coupled to the communication network 106 and provider entertainment content to the callers 100-104 under the control of an on-hold caller interface 108. Depending upon implementation detail, local entertainment content library 110 may download and store entertainment categories such as games and comedy from many different sources, such as entertainment providers 110,130, 140, 150, and 170, over the communication network 106. The communication network 106 may be implemented utilizing Internet protocol standards and could utilize the Internet for communicating entertainment selections. Fourth entertainment provider 170 can provide multi-media utilizing a satellite link to antennae 160. Entertainment providers 110, 130,140,150, and 170 may also provide multimedia-based entertainment for callers who have devices for displaying video. The entertainment content can be transmitted via ground-based radio waves such as those utilized by television or radio stations.

In one configuration, the entertainment providers 110, 130, 140, and 170 can be activated with a selectable access link. The link may be able to receive a television station broadcast, a radio station broadcast, an Internet download, a telephone transmission, a local entertainment content library data stream, and a satellite transmission and couple the link to the caller.

In an illustrative embodiment, when the first caller 100 places a call to a call center or an entity having an on-hold caller interface 108, the caller 100 may be placed on hold due to the unavailability of agents 118-124 or system components.

In other implementations an inbound/outbound system such as a business type PBX's or advanced home telephone systems or any telephone system that has an on-hold capabilities where a "party" can be put on hold can employ the teachings herein.

When it is determined that the caller is on hold, the on-hold caller interface 108 can prompt the caller regarding what type of entertainment including interactive entertainment or games the caller would like to listen to, or participate in while on hold. The system may utilize an interactive voice response system IVR to prompt the caller for an entertainment category, and responsive to a caller's utterance prompt the caller a second time for more specific information such as an artist, a trade name, a show title, and a game show title.

The IVR can help the caller "drill down" in a menu system by asking one or more specific questions and narrowing a selection field. For example if the caller has requested a news category the IVR could provide the options of local news, state news, national news, international news, financial news, sporting news, and weather. Next the IVR could ask if the caller wants to select by region such as local, state, national, and international. Drill down features could be provided for every menu and category.

In one example, the on-hold caller interface 108 provides a voice prompt to the caller of, "You can select from many different entertainment categories at any time by stating yes after a selection is verbally presented, or you can freely speak a choice at any time . . . would you like to hear news . . . television talk shows . . . sporting events in progress . . . sports scores . . . comedy . . . radio talk shows . . . TV shows . . . a variety show . . . play a trivia game . . . play a game show, and so on."

The menu provided to the caller may be tailored based on information stored in memory. Information stored in memory could include past caller preferences, a callers geographic region, previous on hold selections, caller account data, and demographic information.

Depending upon implementation detail, at any time the caller on hold can interrupt and say, "Yes." In some embodiments the on-hold caller interface 108 could confirm the caller's perceived response by, for example, providing "Did you say you would like to listen to (insert perceived selection)?"; and after caller confirmation, a communication link would be activated by the processor 116. The caller selection could be provided to the caller until further caller input is received or the appropriate agent or system becomes available.

In other implementations, the on-hold caller interface 108 would provide to the caller, "What kind of entertainment would you like to hear?" The speech recognition module 112 could convert caller utterance into commands to control the processor 116 to select entertainment categories, specific selections, and ultimately entertainment providers. In one embodiment, when an entertainment category is selected by a caller, the on hold caller interface 108 could provide, "Is there a specific entertainer you would like to hear?"

Depending upon implementation, the caller may reply with a specific artist or entertainer such as, "I would like to hear Howard Stern" and the speech recognition module 112 could process the utterance. In one configuration, the processor 116 can respond to caller selection requests by retrieving the location of the selection from memory and activating a communication link realized by an Internet address, a satellite radio frequency, or a local entertainment library memory location to connect the caller with the entertainment provider storing the caller selection. The entertainment sources such as entertainment content library 110 can provide the caller's entertainment selection via the on-hold caller interface 108 over the communication network 106.

The operations of the on-hold telephone interface 108 can be performed by the processor or any processing platform utilizing instructions retrieved from memory 116. Depending upon implementation detail, when a selection is made the processor could refer to a table in memory 116 to determine which entertainment provider has, or stores the requested materials. In one configuration, during the on-hold period, a caller may interrupt the process and request different or additional materials. In addition to speech input, caller input could be in the form of a touchtone input of touch-tone response that can be recognized and processed by the DTMF detector 114.

The entertainment provided to the caller while on-hold can be terminated when an agent 118-124 becomes available or upon a caller request. Thus, when an agent 118-124 becomes available, the on-hold caller interface 108 can create or receive a control signal and connect the caller 100-104 to one of the agents 118-124. Alternately, the speech recognition system 112 can monitor the caller's line for caller utterance and process discernable utterance. When a caller's utterance is not understood, the speech recognition system 112 can provide additional queries to address a caller's request. For example, a caller may indicate that they want to replay the current entertainment selection, play a different selection; a different entertainer or a next selection from a line of related entertainment materials and the on-hold caller interface 100 can clarify the utterance by replying, "Did you want to . . . ."

As depicted, entertainment content library 110 may be implemented utilizing a data storage system that is proximate to the on hold caller interface 108. The entertainment content library 110 could periodically receive downloads from at least one of entertainment providers 130, 140, 150 and 170. The entertainment provider 110, 130,140,150, and 170 may provide the audio in a digital or analog format. For example, the audio may be provided in an MP3, WMA, WAVE, AVI, or any other suitable format.

In one configuration, a recording entities or entertainment suppliers can advertise newly released entertainment selections or previews to the caller. In one configuration data storage for the entertainment suppliers can be remotely located from the on-hold caller interface system 108 wherein the data/entertainment may be transported from the remote location in real-time by radio waves, telephone lines, or the Internet. A remotely located entertainment content system may be operated by a service provided for the call center. For example, entertainment content library 110 may be an on site jukebox having a digital based satellite radio system receiver for receiving XM or SIRUS radio transmissions.

In yet another implementation interactive games could be provided to the caller. For example, games requiring caller (participant) responses such as Family Feud, Jeopardy, Wheel of Fortune, Trivial Pursuit and other games could be provided for caller selection. Awards such as credits on a bill could be given for callers who are successful at the games.

Figure 2:
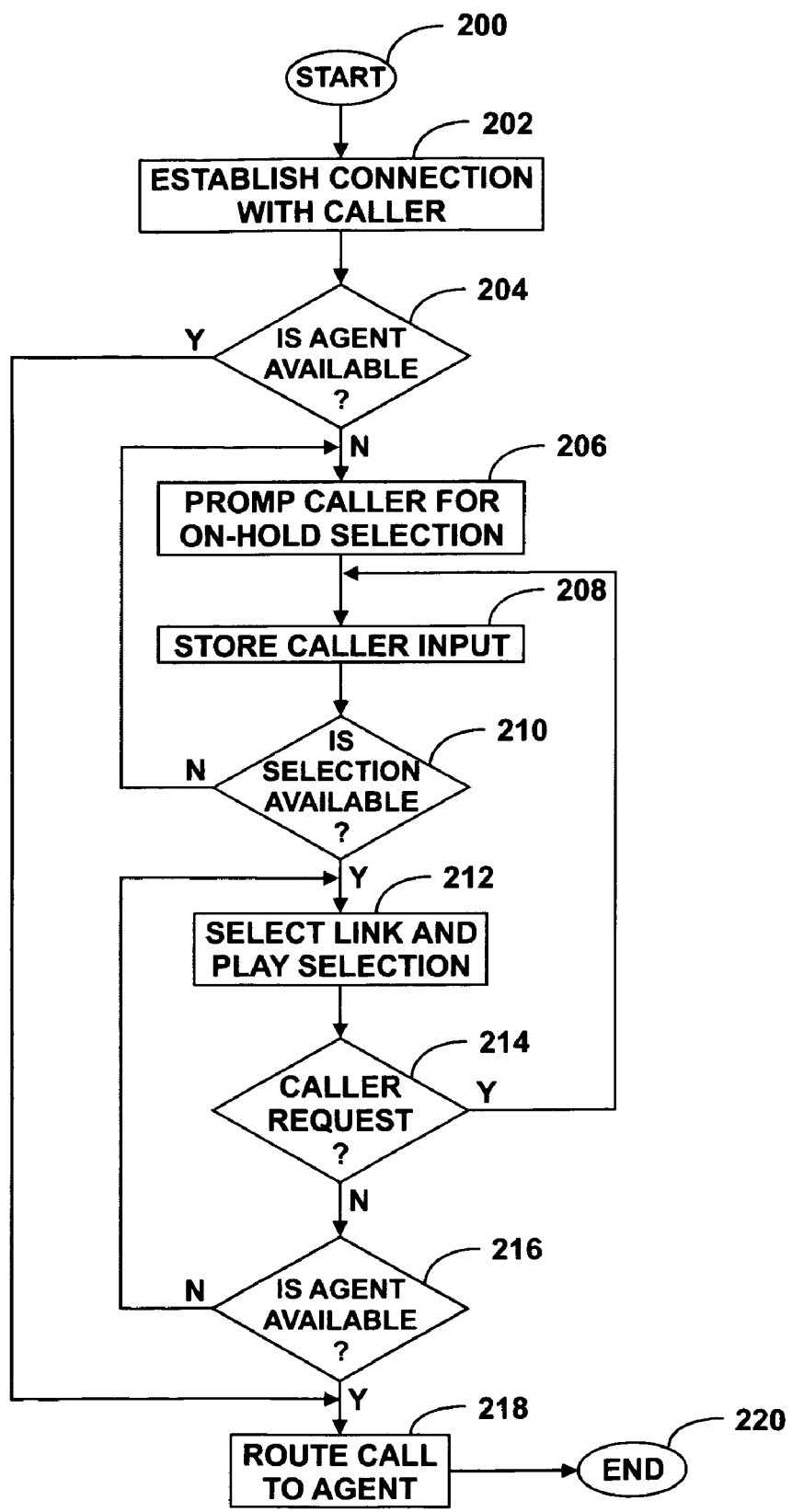
FIG. 2 is a flow diagram that illustrates a method of providing user selectable activities and entertainment while on-hold during a call.

Referring to FIG. 2, an illustrative embodiment of a method of processing a user request for on-hold entertainment is illustrated. The method starts at 200 and proceeds to step 202 where a connection is established between a caller and a call receiving system. The method determines whether the agent or system requested by the caller is available to the caller at step 204. When the agent is available, the call is routed to the agent as shown in step 218. When the agent or system is not available, the call progresses to step 206 where the caller is prompted for a personalized on-hold entertainment selection.

The caller can be prompted in many different ways in order to efficiently match a caller's desires with available entertainment selections. The system could prompt the caller announcing the available entertainment categories/types, genres, the available entertainers, games, artists, and songs. Additionally, the method could allow the caller to "freely speak" where the caller merely requests a specific category, game, entertainer, or title. The caller's input is stored at step 208 and the method determines if the caller selection is available at step 210. When the caller selection is not available the method returns to step 206 where the caller is again prompted. When the selection is available a link is selected based on the caller input and the selection is played to the caller as illustrated at step 212. The caller is monitored for additional input at step 214 and if a caller request is detected the method proceeds to step 208 where the caller input is stored and processed.

Referring back to step 214 during the hold session the caller may also request to advance the entertainment to a specific portion of the media, request the selection be replayed or request that the selection be paused. Further, the caller could request to hear samples of different entertainment shows such as "David Letterman's top 10 for the day", the number one hit per Billboard Magazine, newly released songs or top ranked hits from a specific artist. When no caller input is detected the method proceeds to 216 to determine if the agent is available. If the agent is not available then selection continues play as in step 212. When the agent or system becomes available the call can be routed to the agent at step 218.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A caller on-hold system comprising:
   an on-hold caller interface configured to provide caller selectable entertainment to a caller while on-hold during a call;
   a processor configured to prompt the caller for selection of an entertainment type by category based upon available entertainment providers;
   a receiver for receiving caller input; and
   a communication link between the on-hold caller interface and the available entertainment providers wherein the caller can select a category of entertainment from a plurality of entertainment providers, and wherein the caller input includes one of requesting to advance the caller selectable entertainment to a specific point and requesting to pause the caller selectable entertainment;
   wherein the processor enables an award to be provided to the caller based on participation in the caller selectable entertainment when the caller selectable entertainment is a game.

2. The system of claim 1, further comprising an entertainment storage system accessible by selectable links, the entertainment storage system communicatively coupled to the processor to provide audio to the caller.

3. The system of claim 1, further comprising a speech recognition module configured to receive an utterance from the caller, the processor configured to provide an entertainment selection based on the received utterance.

4. The system of claim 1, further comprising a dual tone multi-frequency detector configured to receive touch tone input from the caller, wherein the processor is configured to provide selectable audio to the caller in response to the touch tone input.

5. A computer readable storage medium comprising:
   operational instructions that, when executed by a processor, cause the processor to establish a connection with a caller at a receiving system and place the caller on hold based on an availability of services associated with the receiving system, the receiving system configured to access a plurality of entertainment categories, the plurality of entertainment categories having a plurality of entertainment providers selectable from communication links;
   operational instructions that, when executed by the processor, cause the processor to receive a first request from the caller for a specific entertainment option selected from the plurality of entertainment categories;
   operational instructions that, when executed by the processor, cause the processor to query the caller for the specific entertainment option when the first request is not recognized;
   operational instructions that, when executed by the processor, cause the processor to prompt the caller for confirmation of the specific entertainment option selected by the caller in response to recognition of the specific entertainment option selected by the caller prior to providing the caller with the specific entertainment option;
   operational instructions that, when executed by the processor, cause the processor to process the first request by the caller;
   operational instructions that, when executed by the processor, cause the processor to provide entertainment to the caller via a selectable communication link while the caller is on-hold; and
   operational instructions that, when executed by the processor, enable an award to be provided to the caller based on participation in the entertainment when the entertainment is a game.

6. The computer readable storage medium of claim 5, further comprising operational instructions that, when executed by the processor, cause the processor to select an access link associated with one of a television station, a radio station, an Internet address, a telephone number, a local entertainment content library, and a satellite transmission.

7. The computer readable storage medium of claim 5, further comprising operational instructions that, when executed by the processor, cause the processor to prompt the caller for an entertainment category, and responsive to an utterance by the caller, prompt the caller for one of an artist, a trade name, a show title, and a game title.

8. The computer readable storage medium of claim 5, further comprising operational instructions that, when executed by the processor, cause the processor to receive show title selections from the caller including one of local news, state news, national news, international news, weather, financial news, television talk shows, sporting events in process, sporting news by region, comedy, radio talk shows, television shows, variety shows, and a local entertainment guide.

9. A method of providing on-hold interactive audio, the method comprising:
   establishing a connection with a caller at a receiving system configured to access a plurality of entertainment providers;
   receiving a first request from the caller for a particular entertainment selection provided by at least one of the plurality of entertainment providers;
   in response to not recognizing the first request, prompting the caller with at least one query to determine the particular entertainment selection;
   in response to recognizing the particular entertainment selection, prompting the caller for confirmation of the particular entertainment selection;
   establishing a communication link with one of the plurality of entertainment providers with respect to the particular entertainment selection associated with the first request after confirmation of the particular entertainment selection to provide the particular entertainment selection to the caller while the caller is on-hold; and
   enabling an award to be provided to the caller based on participation in the particular entertainment selection when the particular entertainment selection is a game.

10. The method of claim 9, further comprising pausing the particular entertainment selection in response to receiving a second request from the caller.

11. The method of claim 9, further comprising playing samples of different entertainment shows in response to receiving a second request from the caller.

* * * * *